United States Patent
Le Cras et al.

(10) Patent No.: US 9,528,479 B2
(45) Date of Patent: Dec. 27, 2016

(54) INJECTOR FOR MIXING TWO PROPELLANTS COMPRISING AT LEAST ONE INJECTION ELEMENT WITH A TRICOAXIAL STRUCTURE

(75) Inventors: Jean-Luc Le Cras, Saint Marcel (FR); Jean-Marie Lonchard, Vernon (FR); Arnaud Fournet, Saint Medard en Jalles (FR); Cyril Verplancke, Asnieres sur Seine (FR); Olivier Delahaye, Oissel (FR); Nicolas Cucco, Gradignan (FR)

(73) Assignee: SNECMA, Paris (FR)

(*) Notice: Subject to any disclaimer, the term of this patent is extended or adjusted under 35 U.S.C. 154(b) by 363 days.

(21) Appl. No.: 14/003,712

(22) PCT Filed: Mar. 6, 2012

(86) PCT No.: PCT/FR2012/050458
§ 371 (c)(1),
(2), (4) Date: Oct. 29, 2013

(87) PCT Pub. No.: WO2012/120230
PCT Pub. Date: Sep. 13, 2012

(65) Prior Publication Data
US 2014/0048625 A1  Feb. 20, 2014

(30) Foreign Application Priority Data

Mar. 7, 2011 (FR) .................................. 11 51816
Mar. 7, 2011 (FR) .................................. 11 51817

(51) Int. Cl.
*F02K 9/52* (2006.01)
*F02M 43/04* (2006.01)

(52) U.S. Cl.
CPC ................ *F02M 43/04* (2013.01); *F02K 9/52* (2013.01)

(58) Field of Classification Search
CPC .................................. F02K 9/52; F02M 43/04
(Continued)

(56) References Cited

U.S. PATENT DOCUMENTS 3,527,056 A   9/1970  Hoffman et al.
3,980,233 A * 9/1976  Simmons .............. F23D 11/107
                                                239/400
(Continued)

FOREIGN PATENT DOCUMENTS

DE  10 2004 029 029 A1   1/2006
DE  10 2008 028 208      12/2009
(Continued)

OTHER PUBLICATIONS

International Search Report Issued Jun. 25, 2012 in PCT/FR12/050458 filed Mar. 6, 2012.
(Continued)

*Primary Examiner* — Jason Boeckmann
(74) *Attorney, Agent, or Firm* — Oblon, McClelland, Maier & Neustadt, L.L.P.

(57) ABSTRACT

An injector for mixing two propellants upstream of a combustion chamber. The injector includes: at least one injection element with a tricoaxial structure installed between two plates which between them delimit a space; and coaxial ducts including an internal coaxial duct and an external coaxial duct that are supplied in parallel with a same propellant, for example via the space.

21 Claims, 3 Drawing Sheets

(58) Field of Classification Search
USPC ............. 239/400, 422, 423, 424, 419.3, 419
See application file for complete search history.

(56) References Cited

U.S. PATENT DOCUMENTS

| | | | |
|---|---|---|---|
| 5,172,548 A | | 12/1992 | Dubedout et al. |
| 5,660,039 A | * | 8/1997 | Sion .......................... F02K 9/52 |
| | | | 239/424 |
| 6,045,061 A | | 4/2000 | Huttlin |
| 6,502,385 B2 | * | 1/2003 | Haeseler ............... B01F 5/0453 |
| | | | 239/424 |

FOREIGN PATENT DOCUMENTS

| | | |
|---|---|---|
| FR | 2 712 030 | 5/1995 |
| FR | 2 871 553 | 12/2005 |
| JP | 1-92560 | 4/1989 |
| JP | 2-115560 | 4/1990 |
| JP | 6 281115 | 10/1994 |
| JP | 8-144853 | 6/1996 |
| RU | 2 205 289 | 5/2003 |
| RU | 2 232 916 | 7/2004 |

OTHER PUBLICATIONS

Japanese Office Action issued in Application No. 2013-557154 on Feb. 23, 2016 (w/ English Translation).

\* cited by examiner

INJECTOR FOR MIXING TWO PROPELLANTS COMPRISING AT LEAST ONE INJECTION ELEMENT WITH A TRICOAXIAL STRUCTURE

BACKGROUND OF THE INVENTION

Field of the Invention

The invention relates to an injector for mixing two propellants upstream from a combustion chamber, for example the combustion chamber of a rocket motor. An injector refers to an assembly made up of one or more injection elements and a structure forming a support and including means for supplying propellants for the concerned injection element(s).

Description of the Related Art

U.S. Pat. No. 6,502,385 describes an injector of the aforementioned type, i.e., including at least one injection element mounted between two fixed plates spaced apart from each other. The assembly making up the injector is also called "injection head". The or each injection element is rigidly secured to the two plates and assembled thereto. According to the embodiment specifically described in this prior art, the injection element is screwed to an upstream base plate and riveted to a downstream plate topping the combustion chamber. The injection element is of the tricoaxial type, i.e., comprising an annular middle coaxial duct for a first propellant and two coaxial ducts for a second propellant, an annular internal coaxial duct and external coaxial duct, respectively. The downstream ends of these three ducts open beyond a hole of the downstream plate such that the mixture of the two propellants is discharged, toward the combustion chamber. The outer tubular enclosure, delimiting the external coaxial duct, is riveted to the downstream plate. The injection element(s) contribute to stabilizing the position thereof relative to the upstream plate and preventing it from deforming.

Furthermore, the described injection element is such that the internal coaxial duct and the external coaxial duct (in which said second propellant circulates) communicate by passages formed radially and pass through the middle coaxial duct where the first propellant circulates. It is therefore difficult to calibrate the respective flow rates of said second propellant in the internal and external coaxial ducts. Furthermore, the interlocking of the parts making up the injection element, due to the existence of these passages through the middle coaxial duct, is fairly complex and requires implementing delicate and expensive assembly techniques.

BRIEF SUMMARY OF THE INVENTION

The invention makes it possible to resolve these problems.

More particularly, the invention relates to an injector for mixing two propellants, of the type including at least one injection element with a tricoaxial structure installed between two plates or similar members, an upstream plate and a downstream plate delimiting a space between them, and rigidly fixed to those two plates, three coaxial ducts being defined in said injection element, an annular middle coaxial duct for a first propellant and two coaxial ducts for a second propellant, an annular internal coaxial duct and external coaxial duct, respectively, characterized in that said internal coaxial duct and external coaxial duct are supplied in parallel with a second propellant.

According to one embodiment, the space between the two upstream and downstream plates forms a space for introducing said second propellant, and the or each injection element is provided with independent and calibrated passages: at least one first passage directly connecting said introduction space to said internal coaxial duct and at least one second passage directly connecting said introduction space to said external coaxial duct.

According to one advantageous embodiment, the or each injection element includes:

a first segment fixed to said upstream plate and in which said internal coaxial duct is formed, a second segment fixed to said first segment and defining said annular middle coaxial duct therewith, and a third segment fixed to said second segment and defining said annular external coaxial duct therewith.

The first segment simply includes holes extending between said internal coaxial duct and said space defined between the plates. These holes may be formed at an angle relative to a radial direction.

Similarly, the third segment advantageously includes holes extending between said external coaxial duct and said space defined between the plates. These holes may also be formed at an angle relative to a radial direction.

According to one advantageous combination of means, said first segment includes a central body around which said internal coaxial duct is formed, the latter in that case having an annular configuration.

BRIEF DESCRIPTION OF THE SEVERAL VIEWS OF THE DRAWINGS

The invention will be better understood, and other advantages thereof will appear more clearly, in light of the following description of several injectors according to its principle, provided solely as examples and done in reference to the appended drawings, in which.

DETAILED DESCRIPTION OF THE INVENTION

Figure 1:
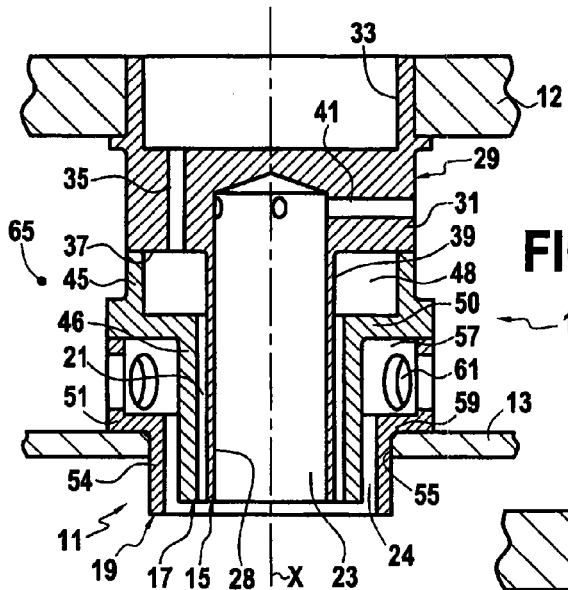
FIG. 1 is a diagrammatic cross-sectional elevation view of an injector for mixing two propellants.

In reference more particularly to FIG. 1, an injector 11 is shown of the type including an upstream plate 12 or similar member, a downstream plate 13 or similar member, and at least one injection element 14 rigidly secured to the two plates. Preferably, the injector includes a plurality of such injection elements arranged between the two plates in an axisymmetric configuration (not shown). The set of the two plates and the injection element(s) makes up the injector or injection head.

The injection element(s) are fixed, for example welded, brazed or screwed, near their respective axial ends, to the two upstream 12 and downstream 13 plates. Each injection element therefore, from a mechanical perspective, constitutes a sort of spacer that limits the deformation of the plates, in particular that of the plate 13, which is subject to a high temperature gradient.

Each injection element allows an axis of symmetry X perpendicular to the plates 12 and 13 and, transversely to that axis, has a circular contour.

According to the non-limiting described examples, each injection element with a tricoaxial structure includes three tubular segments 15, 17, 19, assembled together so as to form three coaxial ducts 21, 23 and 24 in which the two propellants circulate.

For example, in FIG. 1, a middle coaxial duct 21, an internal coaxial duct 23 and an external coaxial duct 24 are shown. The first propellant circulates in the middle coaxial duct 21 and the second propellant circulates both in the internal coaxial duct 23 and the external coaxial duct 24, the two propellants mixing at the outlets of the three coaxial ducts, downstream from the plate 13. The mixture is then introduced into a combustion chamber (not shown).

The three coaxial segments 15, 17, 19 are assembled to each other by welding, brazing, or optionally by screwing.

The first segment 15 is defined in a metal block 29 and is sealably fixed to the upstream plate 12. It includes a first section 31 in which an upstream basin 33 is formed receiving the first propellant. The latter is introduced upstream from the plate 12. The basin 33 extends by a plurality of piercings 35, here parallel to the axis of symmetry X of the injection element 14 and emerging on a shoulder 37. According to one alternative not shown, shared by all of the embodiments, the piercings 35 may be formed in inclined directions, i.e., not parallel to the axis X and at an angle such that a rotational movement of the first propellant is imparted at the outlet of the piercings 35.

The shoulder 37 separates the first section 31 from a second central, cylindrical section 39 with a reduced diameter. In the second section 39 and continued in part of the first section 31, the internal coaxial duct 23 is embodied by an axial blind hole 28. The latter is obtained by simple axial drilling of the metal block 29. Holes 41 extend between the periphery of the first segment 15 and the internal coaxial duct. The holes 41 emerge outwardly in the space defined between the two plates 12, 13. They may form an angle relative to a radial direction to impart a rotational movement of the second propellant in the internal coaxial duct 23.

The second, tubular segment 17 includes two sections with different diameters. The end of the section 45 with the larger diameter is fixed (here welded or brazed) at the periphery of the shoulder 37 of the first segment 15. The section 46 with the smaller diameter extends across from the outer wall of the first segment to define the middle coaxial duct 21 therewith.

An annular distribution chamber 48 is thus defined between the shoulder 37 and a flat annular wall 50 of the second segment, connecting the two sections 45, 46 thereof. This distribution chamber 48 communicates with the middle coaxial duct 21. Piercings 35 emerge in the distribution chamber 48.

The third, tubular segment 19 is generally similar to the second segment 17. One end of its section of larger diameter 51 is fixed, here welded or brazed, to the perimeter of the flat annular wall 50 of the second segment 17. Its section of smaller diameter 54 extends across from the outer surface of the section 46 of said second segment and defines the external coaxial duct 24 therewith. The section 54 is sealably fixed to the edge of the hole 55 passing through the plate 13, here by brazing or welding.

An annular distribution channel 57 is defined between said flat wall 50 of the second segment 17 and a flat annular wall 59 connecting the two sections 51, 54 of the third segment 19. This wall 59 abuts against the inner face of the plate 13.

The distribution chamber 57 communicates with the annular external coaxial duct 24. Radial holes 61 are formed in the section 51 with a large diameter and emerge on the one hand in the distribution chamber 57 and on the other hand in the space 65.

The second propellant is supplied via the space 65 for the injection element(s) 14.

The holes 61 may form an angle relative to a radial direction to impart a rotational movement to the second propellant in the distribution chamber 57 and the external coaxial duct 24.

Thus, the space 65 defined between the plates 12, 13 constitutes a space for introducing the second propellant for the injection element(s) and the arrangement described above is such that the internal coaxial duct 23 and the external coaxial duct 24 are supplied in parallel with a second propellant, through the holes 41 and 61, respectively.

These holes constitute independent and calibrated passages. At least one first passage (the holes 41) directly connects said introduction space 65 to the internal coaxial duct 23 and at least one second passage (the holes 61) directly connects the introduction space 65 to the external coaxial duct. The adjustment of the flow rates between the internal and external coaxial ducts is therefore facilitated. Furthermore, the structure of each injection element is extremely simple and inexpensive.

Figure 2:
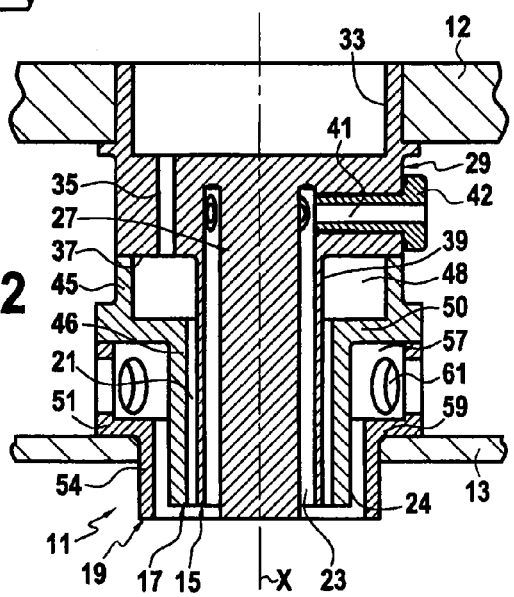
FIG. 2 is a view similar to FIG. 1, illustrating one alternative.

The embodiment of FIG. 2 is similar to that of FIG. 1, except regarding the structure of the first segment, which includes a central body 27. The other similar elements bear the same numerical references and will not be described in further detail. This central body gives the internal coaxial duct 23 an annular structure making it possible to better reconcile the flow rate and speed imperatives of the different flows of propellants, just before they are mixed. In other words, the first segment includes a cylindrical central body around which the annular internal coaxial duct 23 is formed. In the example of FIG. 2, the central body 27 and the first segment 15 form a single block (the metal block 29) and the internal coaxial duct is annually hollowed out depthwise in that block, so as to individualize the central body 27. The internal coaxial duct 23 may be made by EDM, this technique being known in itself.

Furthermore, advantageously, the holes 41 are formed in tips 42 attached in the thickness of the metal block 29. The holes 41 are therefore easier to calibrate. This alternative may apply to all of the embodiments.

Figure 3:
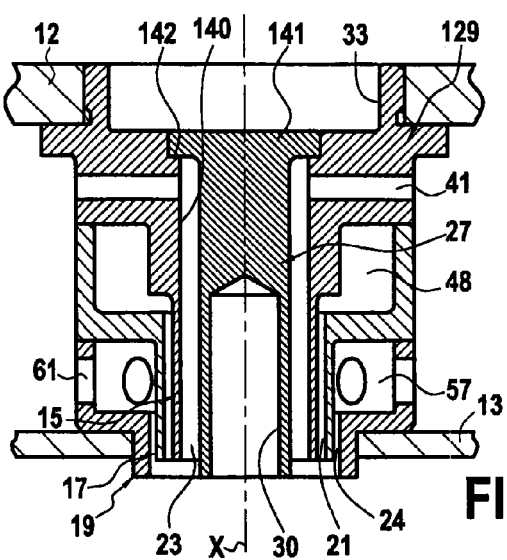
FIG. 3 is a view similar to FIG. 1, illustrating another alternative.

In the embodiment of FIG. 3, the central body 27 is attached in an axial recess of said first segment, which extends from the basin 33 to the downstream end of the injection element. In other words, the first segment is made in two welded coaxial parts, an outer part 129 with a tubular shape and the central part 27 that forms the central body. This is therefore an attached element, welded or brazed, in an axial piercing 140 of the injection element. This attached element here has a cylindrical shape ending, upstream, by an end with a larger diameter 141 forming a flange, welded or brazed in an annular recess 142 forming a shoulder, of the corresponding (upstream) end of said injection element. Once the central body is welded, the basin 33, receiving the first propellant, is reconstituted as in the preceding examples. In this example, the central body 27 includes an open recess 30, at its downstream end. This recess defines a turbulent recirculation zone downstream from the central body. It also reduces the mass of the central body. This recess also makes it possible to reduce the risks of aeroelastic coupling between the flow and the first specific vibration modes of the central body. This recess is optional and compatible with the embodiment of FIG. 2.

Figure 4:
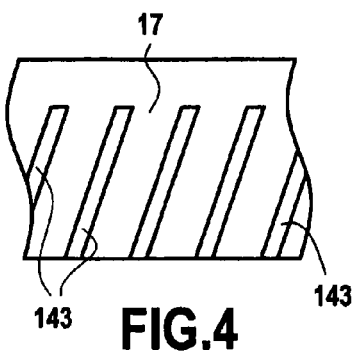
FIG. 4 is a detail view illustrating a wall of a tubular element, provided with helical, oblique ribs.

FIG. 4 describes one advantageous alternative in which helical fins 143 (or grooves) are formed on at least one face of a wall delimiting one of the coaxial ducts 21, 13, 24. In FIG. 4, the wall 17 is shown provided with such fins (or grooves) on its inner wall, such that they extend inside the middle coaxial duct 21. A so-called "swirled" circulation is thus obtained in that duct 21. The same arrangement can be provided on one wall of the tubular element 15 or 19, or on the outer wall of the central body 27. In that case, the fins 143 or grooves extend in the internal and/or external coaxial duct to create the same type of "swirled" circulation therein.

Figure 5:
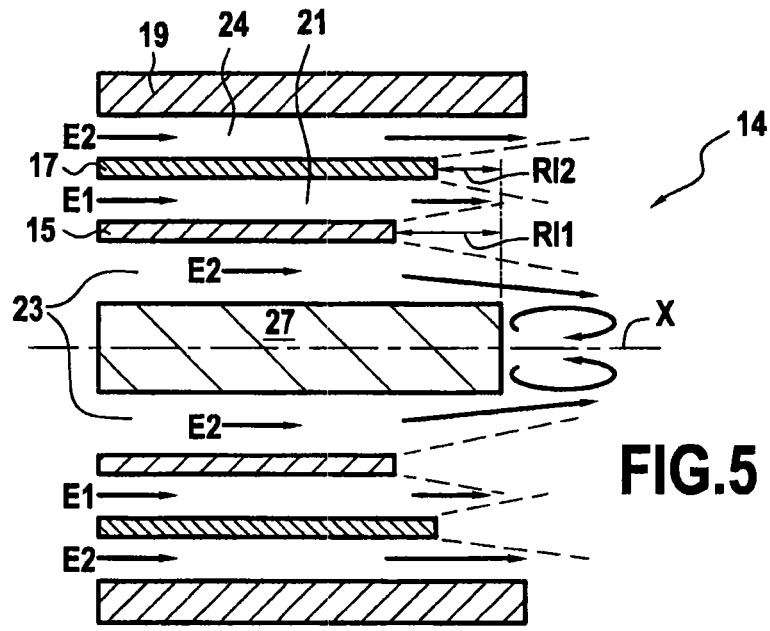
FIG. 5 is a diagrammatic axial cross-sectional view of a first embodiment of the end part of an injection element according to the invention.
Figure 6:
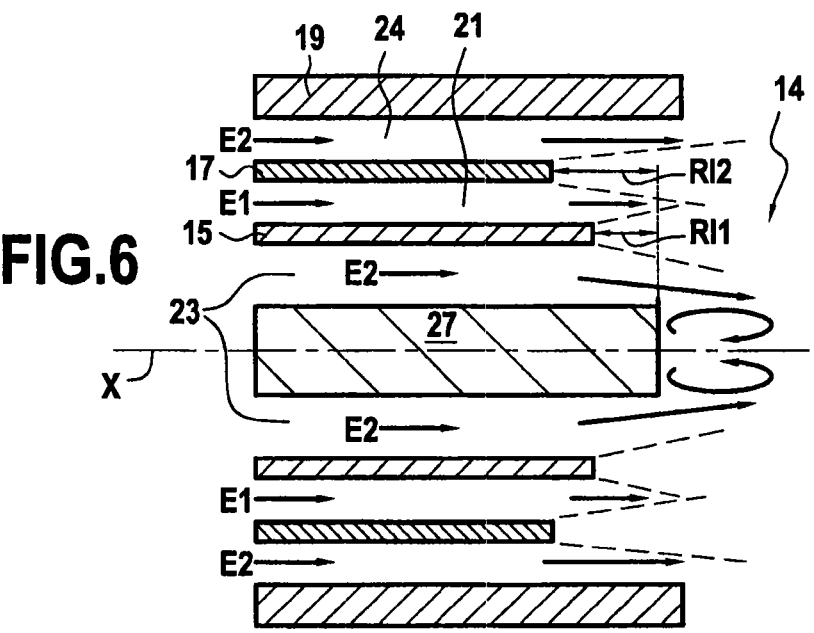
FIG. 6 is a view similar to FIG. 5, illustrating one alternative.
Figure 7:
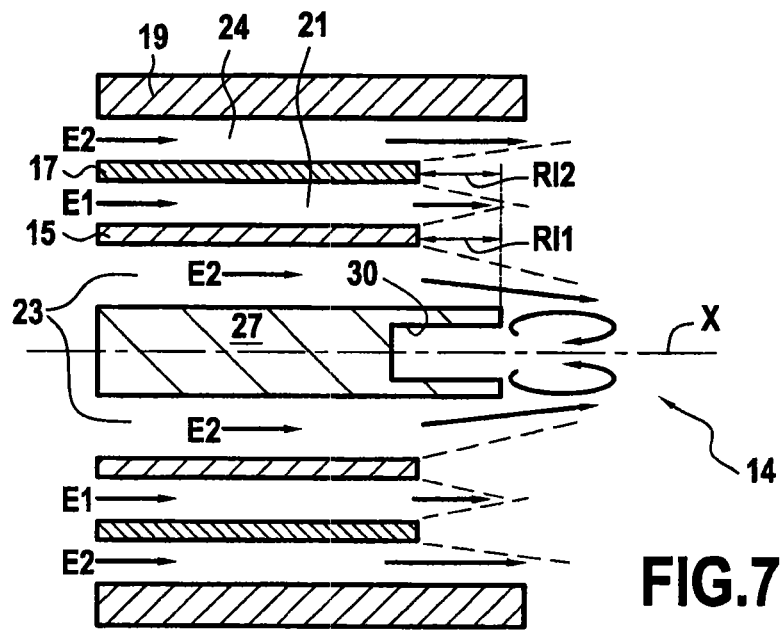
FIG. 7 is a view similar to FIG. 5, illustrating another alternative.

Other advantageous features of the injection element 14 as such are described in reference to FIGS. 5 to 7. In these figures, the end part of an injection element 14 with a tricoaxial structure for mixing two propellants is shown. The injection element allows an axis of symmetry X. The manner in which the different component parts of this injection element are arranged relative to one another and kept in their respective positions while all being connected to the two supply circuits for the propellants is not shown. It will be recalled that multiple injection elements can thus be installed parallel to each other using an axisymmetric configuration to form an injector.

As before, the injection element 14 comprises, in its end part where the two propellants must mix, several tubular segments 15, 17, 19 defining annular coaxial ducts. An annular middle coaxial duct 21 can be seen, in which a first propellant E1 circulates, and that middle coaxial duct adjoins two coaxial ducts 23, 24 in which a second propellant E2 circulates. One can thus respectively see an internal coaxial duct 23 and an external coaxial duct 24, which are annular.

The injection element also includes an inner central body 27 arranged axially, along the axis X, inside the internal coaxial duct 23 in which part of the second propellant E2 circulates. In other words, this inner central body 27 imparts an annular configuration to the internal coaxial duct 23.

According to the embodiment of FIG. 5, the end of the outer wall of the internal coaxial duct 23 has a first axial indentation RI1 relative to the end of the central body 27. It is also characterized by the fact that the end of the inner wall of the external coaxial duct 24 has a second indentation RI2 relative to the end of the central body 27.

These two indentations RI1 and RI2 are called "inner indentations". It is clear that the injection element may include only a single inner indentation defined above if the end of the wall of the other duct is situated in the same radial plane as that of the end of the central body.

In the embodiment of FIG. 5, two inner indentations RI1, RI2 are shown, but said first indentation RI1 is larger than said second indentation RI2. On the contrary, according to FIG. 6, it will be noted that the first indentation RI1 is smaller than the second indentation RI2.

Lastly, according to the embodiment of FIG. 7, it will be noted that the first and second indentations RI1, RI2 are equal.

Furthermore, in the embodiment of FIG. 7, an open recess 30 has been formed at the downstream end of the central body 27.

All of these embodiments have been illustrated to show the set of additional parameters available to act structurally on the quality of the mixture of the two propellants.

The diameter, or more generally the volume, of the central body 27 makes it possible to adjust the section of the internal coaxial duct 23, henceforth annular, and consequently to adjust the speed of the part of the second propellant that circulates in that duct, to obtain the desired inner shearing of the first propellant emerging from the annular middle coaxial duct 21. Secondly, the presence of the open recess 30 at the end of the central body makes it possible to act on a recirculation area downstream from the central body. The shape and dimensions of that recess make it possible to adjust the configuration and size of that recirculation area. Lastly, by acting on the potential presence of one or two inner indentations, it is also possible to act on the turbulence created in the shearing area, to optimize the mixing of the propellants.

Figure 8:
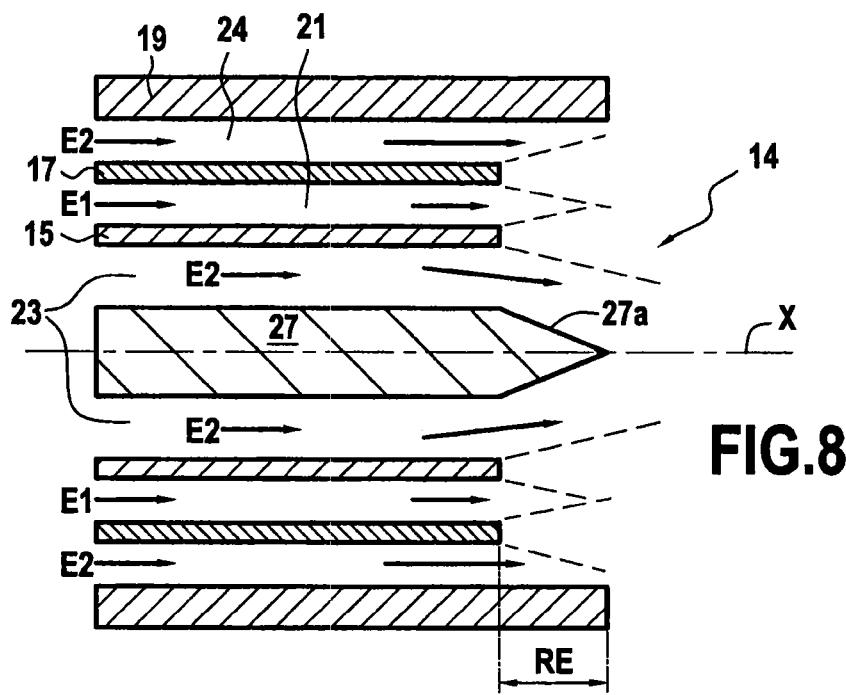
FIG. 8 is a view similar to FIG. 5, illustrating still another alternative.

On the contrary, if one wishes to reduce the downstream recirculation area, it is possible to extend the central body in a tip, instead of forming a recess at the end thereof, as indicated above. This situation is illustrated in FIG. 8. In that example, the tip 27a extends inside the space of an indentation RE, called outer indentation, defined between the end of the outer enclosure (the tubular segment 19) and the end of at least one coaxial duct 21, 23, 24 defined above.

The invention claimed is:

1. An injector for mixing two propellants, comprising:
    several injection elements with a tricoaxial structure installed between two plates, an upstream plate and a downstream plate delimiting a space therebetween; and
    three coaxial ducts being defined in the injection element, including an annular middle coaxial duct for a first propellant and two coaxial ducts for a second propellant, the two coaxial ducts including an annular internal coaxial duct and external coaxial duct, respectively,
    wherein the internal coaxial duct and the external coaxial duct are supplied in parallel with a second propellant,
    wherein each injection element is rigidly fixed to the two plates, and
    wherein each injection element includes:
        a first segment directly fixed to the upstream plate and in which the internal coaxial duct is formed,
        a second segment directly fixed to the first segment and defining the annular middle coaxial duct therewith, and
        a third segment directly fixed to the second segment and defining the annular external coaxial duct therewith.

2. The injector according to claim 1, wherein the space between the two upstream and downstream plates forms a space for introducing the second propellant and at least one injection element includes independent and calibrated passages including: at least one first passage directly connecting the introduction space to the internal coaxial duct and at least one second passage directly connecting the introduction space to the external coaxial duct.

3. The injector according to claim 1, wherein the first segment includes holes extending between the internal coaxial duct and the space defined between the plates.

4. The injector according to claim 3, wherein the holes of the first segment are formed at an angle relative to a radial direction.

5. The injector according to claim 1, wherein the third segment includes holes extending between the external coaxial duct and the space defined between the plates.

6. The injector according to claim 5, wherein the holes of the third segment are formed at an angle relative to a radial direction.

7. The injector according to claim 1, wherein the first segment includes a central body around which the annular internal coaxial duct is formed.

8. The injector according to claim 7, wherein the central body and the first segment form a single block, the internal coaxial duct being annularly hollowed depth wise so as to individualize the central body.

9. The injector according to claim 7, wherein the central body is attached in an axial recess of the first segment.

10. The injector according to claim 1, wherein fins or helical grooves are formed on a face of at least one wall delimiting one of the coaxial ducts.

11. The injector according to claim 1, wherein the at least one injection element further includes an inner central body arranged axially inside the internal coaxial duct to give it an annular configuration, an end of an outer wall of the internal coaxial duct includes a first axial indentation relative to an end of a central body and/or an end of an inner wall of the external coaxial duct includes a second axial indentation relative to the end of the central body.

12. The injector according to claim 11, wherein a downstream end of the central body includes an open indentation.

13. The injector according to claim 11, wherein the first and second indentations exist and are equal.

14. The injector according to claim 11, wherein the first and second indentations exist and are unequal.

15. The injector according to claim 14, wherein the first indentation is larger than the second indentation.

16. The injector according to claim 14, wherein the first indentation is smaller than the second indentation.

17. The injector according to claim 11, wherein the central body has a tip.

18. The injector according to claim 1, wherein each injection element is rigidly fixed to the two plates by welding or brazing.

19. The injector according to claim 1, wherein the first segment includes a first upstream section in which an upstream basin is formed for receiving the first propellant, a second downstream cylindrical section having a smaller diameter than the first upstream section, and a shoulder separating the first and second sections, and wherein the upstream basin is introduced upstream from the upstream plate, and walls defining an interior space of the basin are fixed in a hole provided in the upstream wall.

20. The injector according to claim 1, wherein the first segment is made of two welded coaxial parts: an outer part with a tubular shape and a central part forming a central body.

21. The injector according to claim 1, wherein the second segment is tubular and includes a first section, a second section having a smaller diameter than the first section of the second segment, and a flat annular wall connecting the first and second sections, and wherein the third segment is tubular and includes a first section fixed to the flat annular wall of the second segment, and a second section having a smaller diameter than the first section of the third segment and being fixed to a hole provided in the downstream wall.

* * * * *